United States Patent [19]

Cagle

[11] 4,110,225
[45] Aug. 29, 1978

[54] SEALING WELLS
[75] Inventor: William S. Cagle, Tulsa, Okla.
[73] Assignee: Standard Oil Company (Indiana), Chicago, Ill.
[21] Appl. No.: 554,845
[22] Filed: Mar. 3, 1975
[51] Int. Cl.$^2$ .............................................. C09K 7/00
[52] U.S. Cl. ............................ 252/8.5 LC; 166/292; 175/72
[58] Field of Search .................... 252/8.5 LC; 175/72; 166/292

[56] References Cited
U.S. PATENT DOCUMENTS

| | | | |
|---|---|---|---|
| 2,585,366 | 2/1952 | Bollaert et al. | 106/98 |
| 2,683,690 | 7/1954 | Armentrout | 252/8.5 LC |
| 2,943,680 | 7/1960 | Scott | 252/8.5 LC |
| 3,375,888 | 4/1968 | Lummus et al. | 175/72 |
| 3,380,542 | 4/1968 | Clear | 175/72 |
| 3,411,581 | 11/1968 | Alpha | 175/72 |
| 3,467,193 | 9/1969 | Messenger | 166/92 |
| 3,496,902 | 2/1970 | Cleary | 175/72 |
| 3,692,102 | 12/1971 | Lummus | 175/72 |
| 4,014,394 | 3/1977 | Bailey | 175/72 |

Primary Examiner—Benjamin R. Padgett
Assistant Examiner—J. L. Barr
Attorney, Agent, or Firm—John D. Gassett

[57] ABSTRACT

Zones of lost circulation and other undesired fluid communication channels into a wellbore are sealed by isolating a volume in the well including such a zone and applying greater than formation pressure to a novel slurry spotted in the zone until it hardens into a solid, drillable seal. Redrilling the bore can be accomplished even in soft, geologically young formations, without damaging the seal. The slurry contains per barrel from 5–50 pounds diatomaceous mix (see below), from about 35 to about 350 pounds of oil well cement, and at a minimum about 5 to 6 pounds of a flake type lost-circulation agent. Preferably, the weight per barrel of lost circulation agents is in the range of about 15 to 30 pounds of a mixture containing flakes, fibers, and hard granules.

Diatomaceous mix is powdered diatomaceous earth containing about 2% of ground lime and 8% of ground asbestos fibers.

7 Claims, No Drawings

SEALING WELLS

BACKGROUND OF THE INVENTION

In the drilling and completion of oil and gas wells, it has been well known for a considerable period of time to use small amounts of cement slurry pumped into the well to shut off undesired ingress or egress of fluids to or from the formations encountered. For example, it is well known to "spot" a relatively small volume (typically, at most a few barrels) of slurry at the bottom of the well in order to shut off ingress of bottom water, or the like. It is also well known to define a vertically limited zone (by bridge plugs, packers, or the like) after which again a relatively small volume of cement slurry is pumped into this defined zone and pressure applied to "squeeze" the slurry into an opening in a casing or perforation in the casing, or into a relatively limited open-hole zone. Since application of considerable compressional stress to cement slurry causes very little change in its overall volume, the disappearance of the cement slurry is ordinarily ascribed to fracturing the adjacent formation and causing the cement to fill the interstices of this fracture and any other openings or voids that might exist, such as defects in the cement behind the casing (which is supposed to have completely filled the annulus during the casing cementing job). Occasionally, it is found that the cement will leave the limited zone under effectively the pressure in the adjacent formation. After all, the viscosity of a cement slurry is quite low, being of the order of a few centipoises at most, so it tends to flow into the formation rather than stay in the wellbore, if there is an opening through which it can flow. The water in the slurry tends to leak away and leave some of the finely ground cement in a much more concentrated slurry.

In young geological formations, particularly those of a relatively unconsolidated type, such as the shallower Gulf Coast formations in the United States, there are two difficulties in using cement plugs or cement squeeze jobs. One has already been mentioned: the tendency of the relatively low viscosity cement slurry to flow into the formation. This is particularly disadvantageous if the cement is being used to seal immediately around the edge of the bore. The operator wants to keep the slurry from further penetration radially outward. This tends to minimize the likelihood of the cement doing an adequate sealing job right at the point where such seal is essential.

Also, after the slurry has hardened and the cement is no longer in the liquid phase, it is harder than the adjacent formation. Whether the cement was spotted on bottom or used as a plug in the bore, it is likely when the usual practice of redrilling is carried out, that the drill bit will be deflected by the relatively harder cement plug and tend to sidetrack to form a bore bypassing the region for which the seal was intended, and causing repeated difficulty.

A widely used remedy for solving lost-circulation problems in the relatively soft, young formations along the Gulf Coast and similar areas around the world is to use a different material for the squeeze job. The basic ingredient is diatomaceous earth. As I use the term, "diatomaceous mix" refers to a mixture of powdered diatomaceous earth containing 2 wt. percent of ground lime and 8 wt. percent ground asbestos fibers. A typical slurry for such squeeze consists of the following materials in approximately the portions indicated:

25 lbs/bbl of diatomaceous mix,
0.6 bbl/water,
3 lbs/bbl of a lost-circulation material consisting of flakes, flax, fibers, and granules of medium size, and an equal amount of the same in the coarse size,
20 lbs/bbl of a medium size of particulate strong nut hulls,
5 lbs/bbl of coarse Phenoseal (phenolic resin laminate), and sufficiently finely ground barite to weight the slurry as desired, for example, to the order of 17 lbs/gal.

The problem experienced when using this slurry for squeeze jobs is that its compressive strength is quite low, of the order of 0 to 40 psi. Accordingly, subsequent drilling, rotating, and tripping of the bit (that is, removal of a worn bit and installation of a new bit) weakens the squeeze and once again mud returns are lost to the formation. In one small region along the Louisiana Gulf Coast near Lake Charles, for example, during the four years 1970–1973, 13 squeezes using this kind of slurry were performed and only four lasted longer than a week. As much as $60,000 could have been saved on one of these wells alone if the seal had held.

As is described later more specifically, I decided to reduce the amount of diatomaceous mix in the material drastically, to the order of five to ten pounds per barrel, and add ordinary oil well-type cement in amounts ranging from 5% to 50% by weight of the total slurry mix. This forms the basis of this invention.

The problem of what to do about solving open-hole lost circulation in such relatively soft and unconsolidated formations had existed for quite a number of years. Attempts to use a diatomaceous mix squeeze, while frequently unsuccessful, have been considered, especially in Louisiana, the best effort made to improve on the situation.

Since making this invention, I have been made aware of the patents listed below concerning mixtures of Portland cement and diatomaceous earth used in slurry form to make a cement. The cements described in these patents in every case are for use in construction or in the cementing of casing in oil wells. There is no teaching in any of them about the use of mixtures of these materials, in conjunction with lost-circulation agents, for the purpose of sealing off lost-circulation zones and the like. In fact, the general understanding among petroleum engineers as to the use of squeeze cementing techniques was that the addition of cement to the diatomaceous mix squeezes employed would be quite detrimental, since the main purpose for using the diatomaceous mix was to have a material which was mechanically considerably softer than the cement itself. These patents are as follows:

U.S. Pat. No. 2,585,336, Bollaert, et al., in which a mixture is made using from 2% to 100% diatomaceous earth, compared to the content of the cement in the slurry. The aim of the inventors was to prevent perlite from settling and to produce a lightweight cement. The diatomaceous earth-cement described in the disclosure is a mixture of Portland cement, perlite and diatomaceous earth, lime, and asbestos fibers.

U.S. Pat. No. 2,793,957, Mangold, et al., refers to a highly permeable cement formed by use of the same basic mixtures of diatomaceous earth with Portland cement, the diatomaceous earth present being from five to seven times the proportion of the Portland cement in the slurry. The aim of the inventors was to produce a light highly permeable cement, entirely opposite to the purpose of my invention.

U.S. Pat. No. 2,961,044, Shell, discusses and claims a cement composition which has diatomaceous earth in the amounts of from 30% to 70% of the Portland cement. The reason for using the diatomaceous earth was to prevent the strength retrogression of a salt-saturated cement. Thus, while Shell wishes (among other uses) to employ his mixture for squeeze cementing, he produces a relatively high-strength cement plug. There is a real tendency when redrilling such a plug for the bit to be deflected or sidetracked so that the new hole is beside rather than through the bore and the seal is ineffective. This is completely different from my invention which minimizes such tendency by producing a plug at least as drillable as the formation in which it is set. Also, Shell is directed to operations using salt-saturated cement slurries, while I prefer using a fresh or brackish water slurry. I employ lost-circulation agents; he makes no teaching of using such additives. Accordingly, his teaching is quite far from mine.

Two further U.S. Pat. Nos. 3,467,198 and 3,558,335, Messenger, describe cement compositions having diatomaceous mix present in the amounts from 0.5% to 10% of the amount of Portland cement present to prevent solids-settling.

SUMMARY OF THE INVENTION

This invention covers a squeeze-cementing technique for stopping lost circulation, utilizing known procedures but a previously unknown mixture of components in the slurry which is squeezed, so that upon hardening the squeezed material is of sufficient strength to form a permanent seal without causing sidetracking of the bit into the adjacent formations when the well is redrilled. Preferably, the mix comprises approximately 0.6 of a barrel of water, five to ten pounds per barrel of diatomaceous mix, oil well Portland cement in an amount ranging from 5% to 50% of total weight per barrel, six pounds per barrel of medium and coarse lost material consisting of flakes, fibers, and granules, approximately 20 pounds per barrel of medium sized granulated strong nut hulls, and sufficient ground barite to weigh the slurry to the order of 15 to 19 pounds per gallon.

DESCRIPTION OF THE PREFERRED EMBODIMENT

It has already been stated that the materials-handling techniques involved in this invention can be any of those already available for squeeze cementing. It is, of course, understood that the same techniques are used for squeezing other materials, for example, cement slurries, slurries of diatomaceous mix, lost-circulation materials, etc.

However, the slurry that is employed in my invention in carrying out these squeeze jobs is distinctly novel, compared to what already was known. This is a slurry which readily and rapidly sets to form a solid having a good compressive strength, as measured with the conventional techniques. For example, in attached Table I, the API compressive strength of three different cements made from slurries according to my invention are shown, ranging from 160 to 400 psi. The standard thickening time of these mixtures is a few hours, typically four hours. The use of the barite (when added in order to increase slurry density) has essentially no effect on the rheological or compressive strength properties of this mixture.

This mixture consists essentially of 5 to 10 ppb of the diatomaceous mix in approximately 0.6 barrels of water, at least 5 to 6 ppb of a flake-type lost-circulation agent, and from 5% to 50% (by weight of the total slurry) of cement. This corresponds to about 37 ppb to 355 ppb. Preferably a greater amount of lost-circulation agent is used. I prefer to use around 3 ppb of medium grade mixture of flake, fiber, and granule lost-circulation material (for example, that currently called Kwik-Seal, Medium), around the same amount of this material coarse grade, and around 10 to 20 ppb of medium grade granules of ground, strong plant seeds or shells (for example, that currently called Tuf-Plug, Medium). One example of suitable flake-type material, made of a phenolic resin laminate, is currently called Phenoseal. Results of an API compressive strength test using the components given above are listed in Table II. Here, the slurry contained 25 ppb of the diatomaceous mix, 3 ppb of medium grade Kwik-Seal, 3 ppb of coarse grade Quick-Seal, 20 ppb of medium grade Tuf-Plug, 5 ppb of coarse grade Phenoseal, and about 0.6 barrels of water. 0.75% of CFR-2, based on weight of cement, was added. The cement varied from 0 to 40% of the slurry mix. Each mix was dehydrated before being cured in a 24-hour, 265° F bath of 3000 psi. Strength of the cured cement was quite adequate. Of course, the slurry with no cement did not show compressive strength.

As earlier mentioned, ground barite can be added to the mixture without seriously affecting its properties. Thus, I may incorporate this common weighting agent to increase the density from about 10 pounds per gallon without barite to from 17 to 19 lb/gal with this additive.

It is apparent from this that this mixture is quite different from cement slurries on the one hand, and from the diatomaceous mix slurries on the other. The compressive strength of the set slurry is quite adequate, and (while not shown in the bench tests) field experience has shown that the drillability of the resultant mixture is about as good as that of the diatomaceous mix.

For example, in tests on four wells where my preferred slurry (as described above) was employed, it was found that the drillability was intermediate between that of the diatomaceous mix in compacted form and set cement, being much closer to that of the diatomaceous mix. On the other hand, the strength of the material was sufficient so that satisfactory seals were maintained under all conditions. It is estimated that the savings resulting in the use of this material over known materials of other kinds which have been tried for improving lost-circulation problems in these young Gulf Coast formations was in the range of $15,000-$25,000 per well.

It should be added that friction reducers, retarders and turbulence inducers, which are already well known in this particular art, can be added as necessary to give a more optimum pumping time or increased pumpability. For example, calcium lignosulfonate and organic acids, such as boric acid, can be used in slurries at concentrations up to 4%, but usually under 1% as retarders to increase setting time of the slurry. Similarly, dispersants and friction reducers, such as proprietary surfactants, can be added in concentrations generally up to 1%, to "thin" the slurry, resulting in turbulent flow occurring at lower pumping rates than for the slurry without this additive. The oilfield cementing service companies readily supply users with information based on the oilfield cement used as to proprietary compound type and concentration to achieve desired initial viscosity reduction. This is well known in this art. It has been found that in actual field mixing and pumping of materials of my invention the material mixed and pumped considerably easier than the conventional diatomaceous mix slurry. About one-third of the usual rig time was required for pumping a 100-barrel pill out of a ribbon blender with the usual pump truck, as compared with an equivalent 100-barrel pill of diatomaceous mix slurry.

It is therefore apparent that what has been disclosed herein is a new technique for squeezing slurries to produce settable materials which rapidly and effectively form seals against lost circulation in the drilling of oil and gas wells and the like, the squeezed materials being of sufficient compressive strength so that the seal is not disturbed by redrilling, yet with a sufficiently enhanced drillability (compared with ordinary cement squeezes) so that on redrilling there is a minimal tendency of the bit to be bypassed and thus upset the seal. It is further apparent from the discussion that has been given above that this particular material in slurry form is relatively tolerant to conventional additives which are employed to increase pumpability, decrease viscosity, increase density, etc.

TABLE I

| Compressive Strength Without Dehydration | |
|---|---|
| % Cement By Wt. of Slurry Mix | 24 Hour API Compressive Strengths* |
| 10 | 160 psi |
| 20 | 185 psi |
| 30 | 400 psi |

*Cured at 250° F

TABLE II

| Compressive Strength, Dehydrated | |
|---|---|
| % Cement[1] By Wt. of Slurry Mix | 24 Hour API Compressive Strengths[2] |
| 0 | 0 psi |
| 10 | 420 psi |
| 20 | 1191 psi |
| 30 | 2229 psi |
| 40 | 3299 psi |

[1] 0.7 Wt. % friction reducer, CFR-2 added, based on weight of cement.
[2] Cured in 265° F bath at 3000 psi.

I claim:
1. A method of sealing wellbores against lost circulation and the like comprising
    (a) preparing an aqueous pumpable slurry of at least about 25 barrels containing per barrel at least 35 pounds of oil well cement, from about 5 to 50 pounds of diatomaceous earth, at least 5 pounds of lost-circulation agent other than diatomaceous earth;
    (b) isolating a zone in said well so that hydraulic pressure above formation pressure at said zone may be applied; and
    (c) pumping said slurry into said zone and maintaining a pressure thereon slightly above formation pressure for a period of at least about eight hours and until said slurry has at least an initial set.
2. A method in accordance with claim 1 in which said slurry contains oil well cement in the range of from about 35 to about 350 pounds per barrel.
3. A method in accordance with claim 2 in which said slurry contains from about 15 to about 60 pounds per barrel of lost-circulation agents including particles in the form of flakes, fibers, and hard granules.
4. A method in accordance with claim 3 in which said slurry contains from about 15 to about 30 pounds per barrel of lost-circulation agents including particles of graded sizes in the form of flakes, fibers, and hard granules.
5. A method in accordance with claim 3 in which said slurry contains a finely ground weighting agent, whereby the slurry density lies in the range of about 10 to about 19 pounds per gallon.
6. A method in accordance with claim 1 in which said diatomaceous earth contains about 2% ground lime and 8% of ground asbestos fibers.
7. A method in accordance with claim 1 in which said zone isolated in step (b) is in a relatively unconsolidated formation.

* * * * *